United States Patent

Ignasiak

[11] 3,939,377
[45] Feb. 17, 1976

[54] PENETRATION PHOSPHORS AND DISPLAY DEVICES

[75] Inventor: Stanley F. Ignasiak, Marlboro, Mass.

[73] Assignee: Sperry Rand Corporation, New York, N.Y.

[22] Filed: Sept. 13, 1974

[21] Appl. No.: 505,710

[52] U.S. Cl. ............ 313/468; 252/301.4 R; 427/68; 427/215; 428/402; 428/403; 428/404; 428/330; 428/323
[51] Int. Cl.$^2$ .......................................... H01J 31/20
[58] Field of Search 117/33.5 C, 33.5 CM, 33.5 CP, 117/100 B; 313/468; 252/301.4 R; 96/34; 428/403, 404

[56] References Cited
UNITED STATES PATENTS

| | | | |
|---|---|---|---|
| 3,046,154 | 7/1962 | Feldman | 117/33.5 |
| 3,204,143 | 8/1965 | Pritchard | 313/13 |
| 3,294,569 | 12/1966 | Messineo et al. | 117/100 B |
| 3,423,621 | 1/1969 | Rayce | 313/468 |
| 3,517,243 | 6/1970 | Jones | 313/92 |
| 3,522,463 | 8/1970 | Bishop | 313/92 |
| 3,560,783 | 2/1971 | Shortes | 313/92 |
| 3,573,084 | 3/1971 | Gallaro | 117/33.5 |
| 3,622,826 | 11/1971 | Royce | 313/92 |
| 3,664,862 | 5/1972 | Kingsley et al. | 117/33.5 CP X |
| 3,714,490 | 1/1973 | Kell | 313/92 |
| 3,721,849 | 3/1973 | Gallaro | 313/92 |
| 3,723,787 | 3/1973 | Blasse et al. | 313/468 |
| 3,738,856 | 6/1973 | Masi | 117/33.5 C |
| 3,767,459 | 10/1973 | Kingsley et al. | 117/100 B |
| 3,791,844 | 2/1974 | Tecotzky | 313/468 X |
| 3,825,436 | 7/1974 | Buchanan et al. | 313/468 X |
| 3,826,679 | 7/1974 | Kingsley et al. | 117/33.5 C X |
| 3,864,273 | 2/1975 | Forbes et al. | 252/301.4 R |

OTHER PUBLICATIONS

Kingsley et al., "Voltage Depondence of Cathode-Ray Efficiency of Phospors: Phospor Particles with Nonluminescent Coatings", *Journal of Applied Physics*, (Vol. 43, No. 7), July 1972.
Prenor et al., "Voltage-Controlled Multicolor CRT Phospors: Preparation and Characteristics", *Journal of Electrochemistry*, (Vol. 119, No. 9), Sept. 1972.
Tecotzky et al., "A New Phospor Approach for Multicolor Displays", presented at Electrochemical Society Meeting, Cleveland, Ohio, Oct. 3, 1971.
Dobrov et al., "Photoconductivity and Luminescence in Lonthanum Oxysulfide", Chemical Abstracts, Vol. 77, Abstract 145260j.
Luckey, "Lanthanum and Gadolinium Oxysulfide Phosphors", Chemical Abstracts, Vol. 77, Abstract 119820x.
Jewett et al., "EPR of Terbium (3+), Praseodymium (3+), Gadolinium (3+), and Eurpium (3+), Ions in Single Crystal Lanthanum Oxysulfide", Chemical Asbstract Vol. 81, Abstract 17958n.

Primary Examiner—George F. Lesmes
Assistant Examiner—Alan T. McDonald
Attorney, Agent, or Firm—Howard P. Terry

[57] ABSTRACT

$La_2 O_2 S$ particles are employed as carrier hosts in a cathodo-luminescent penetration phosphor composition for cathode ray display tubes. Tb and Eu ions are used in low concentrations as activators in the control of the red and green optical emission from within a film of the activated host material.

20 Claims, 9 Drawing Figures

PENETRATION PHOSPHORS AND DISPLAY DEVICES

BACKGROUND OF THE INVENTION

1. Field of the Invention

The invention pertains generally to the field of cathodoluminescent phosphor materials and to cathode ray displays employing them and more particularly concerns improved penetration phosphors for use in bright color display cathode ray indicators.

2. Description of the Prior Art

Cathode ray vacuum tubes satisfactory for application in information displays such as air traffic control, radar, data processing, and the like systems have particular requirements generally not met by cathode ray tubes of the type conventionally available for color television viewing. In particular, they do not necessarily require the many colors needed for a television screen; for example, the provision of blue may even be undesirable. While red and green are readily simultaneously focused by the optics of the normal eye at the sensitive high resolution fovea, the blue component of the image is normally out of focus and its presence may even tire the eye. Further, the very center of the fovea is red and green sensitive, but blue is not appreciably sensed there. Since red and green light may purposely be mixed so as to yield the sensations of orange or of yellow in the eye, a wide range of colors adequate for information displays is available without the use of blue.

Further features are desirable in an information display; a major need is to provide brightness and contrast when the display is viewed in a high ambient light level, including an light, whereas conventional color cathode ray television tubes are useful only at low or medium light levels. High resolution, especially in the center of the screen, not available in conventional tubes, is also desired. Relatively simple electron beam focusing and scanning elements are also desired so that either faster scanning or random beam positioning as both often required for presenting computer information are easily achieved.

While several kinds of color television cathode ray tubes are currently available, including the older type with a mask with round holes; the in-line, slot-mask color tube, and the recent slit mask color tube, all of these use multiple guns and complex electron beam focusing and scanning arrangements and are generally not suited for use in information displays, especially where random deflection is needed. Resolution is poor, and sensitivity to stray and earth's magnetic fields is undesirably high. Because they require multiple cathode and multiple electrode systems, sensitivity to shock and to vibration is also excessive.

While originally conceived for use in color television receiver displays, the penetration phosphor color tube and the principles it employs offer several advantages for use in information displays. The penetration phosphor color displays of the present invention overcomes the defects of prior art color displays, again permitting much more information to be displayed effectively simultaneously than by a black and white tube. Additionally, recognition of individual data representations in the displayed material when colored is much more rapid than in a monochromatic or black and white display.

The conventional penetration phosphor cathode ray tube in its most prevalent form has a viewing screen which uses controlled penetration of electrons into a series of phosphor layers for producing therein light of a corresponding series of colors. For example, the screen may include two different phosphor layers, each very thin, uniform, and separated by a transparent dielectric layer. When the electron beam is driven by a relatively low voltage, the energy of the electrons is not sufficient to penetrate the dielectric barrier layer; only the phosphor of the first layer is excited and only its corresponding color is produced. At higher electron beam voltages and correspondingly higher electron energies, the phosphors of both layers are excited, the intensity of the color contribution by the second layer phosphor increases as the electron beam energy is increased.

Full use may be made of the penetration phosphor characteristics in providing a variable color display while using only one electron beam simply by controlling the voltage on the beam acceleration electrode adjacent the cathode. With red and green emitting phosphors, successive changes in the beam acceleration voltage generate distinct colors; for example, red, orange, yellow, or green may thus be generated. Only one suitably controlled electron gun is required and the apertured masks of prior art color television tubes are eliminated along with other features undesirable for use in information displays.

The prior art provides penetration phosphor display tubes which appear to fall in four categories, the principal of these being the aforementioned multi-layer type in which several alternating layers of phosphors and dielectric barrier layers are placed on the screen of the tube by sedimentation. Very thin uniform layers are required for use with conveniently low acceleration voltages and they are difficult to form because of the many steps involved and of the close tolerances to be held on layer thicknesses. It has also been proposed to coat one or more layers of very small phosphor particles on larger phosphor particles emitting a different light color, the composite particles being built up using gelatin to hold them together. Thus, each particle is a multi-layered structure and may include alternated barrier layers. Particle size is a serious problem since the greater the number of layers added, the greater becomes particle size. The very small particles are not easily obtained and generally have low luminosity and are inefficient.

A third prior art approach involves the use of a barrier layer green phosphor mixed with a red phosphor. The barrier layers are formed on ZnS as a host material, so that only broad band green emission is obtained and not the desired line spectral emission. The green phosphor is coated with Zn O or Zn S or Co S is diffused into the surface of the ZnS. The green light produced by this structure is unsaturated and broad band and the colors are not distinct.

While certain rare earth materials have been proposed for use in display devices, the prior art has given only minor attention to rare earth materials for application in penetration phosphor displays. It appears that one approach to the penetration phosphor display area has been made using a rare earth material, but the color at low beam voltages is green and at high voltages, red is obtained. Such a particle can not be mixed with an additional phosphor, the first emission color being green. The saturation of the colors is inferior and color control is difficult since the same activator must be used for all light emission.

SUMMARY OF THE INVENTION

The present invention relates to electron beam excitable phosphor materials for use in cathode ray display tubes and to cathode ray tubes employing them; in particular, the invention pertains to improved and efficient penetration phosphors overcoming the problems of the prior art and to their use in bright color display cathode ray tube indicators. On the phosphor display screen, $La_2O_2S$ particles are employed as host elements, with low concentrations of Tb and Eu ions present within the particle material for the desired flexible control of red and green color emission from within a thin film of the host particles.

DESCRIPTION OF THE PREFERRED EMBODIMENTS

According to one aspect of the present invention, lanthanum oxysulfide or $La_2O_2S$ is employed as the host material in a cathodo-luminescent penetration phosphor composition. As activators, terbium (Tb) and europium (Eu) ions are used in the controlled generation of green and red optical emission from within the host material. The novel phosphor material in a preferrred case is employed in particulate form, the Tb ions being supplied as $Tb_2O_2S$ within the particles and the Eu ions in the form of $Eu_2O_2S$. The activator concentrations are preferably very low compared to that of the host. In the preferred particle 8 of FIG. 1, the Tb ion concentration is substantially homogeneous and the Eu ion concentration is preferably increased radially within the particle from substantially the effective geometrical center of the latter. In particular, the Eu concentration may be substantially zero at the interface 9 and within the central region 5 and may increase in the outer region 6 from interface 9 toward the surface of particle 8. Because the phosphor composition of the particle is entirely made up of mutually compatible rare-earth oxysulfides, problems due to the often very different chemical and physical properties of prior art constituent materials are avoided.

Figure 2:
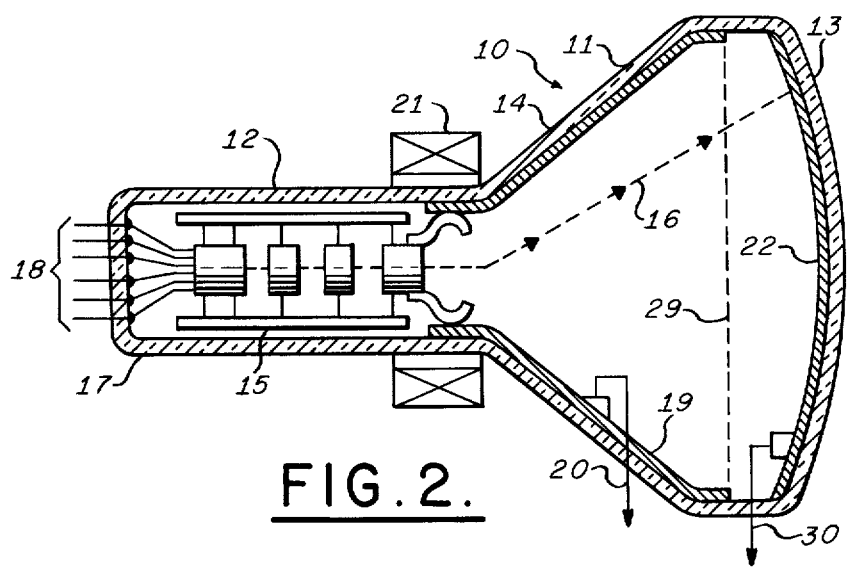
FIG. 2 is a cross section view of a representative cathode ray vacuum tube display in which the novel phosphor may be used.

FIG. 2 illustrates a cathode ray tube in which the invention may be employed; the tube 10 consists of a vacuum envelope 11 including a neck 12, a viewing face plate 13, and a conically shaped transition section 14 for completing the vacuum envelope 11. An electron gun 15 is supported within the neck 12 and is adapted to project an electron beam represented by the dotted line 16 toward an inner surface of face plate 13. The neck 12 is closed at its end opposite face plate 13 by a steam structure 17 through which a plurality of lead-in wires 18 is sealed. Suitable operating potentials may be applied to the electron gun 15 and to its associated cathode through the conductors 18. A conducting coating 19 is provided on the internal surface of the conical section 14 of envelope 11 and serves as an accelerating electrode for electron beam 16. A suitable high voltage is supplied from a conventional power supply (not shown) to the conducting coating 19 by a terminal sealed through the glass cone 14, as represented at 20. A magnetic deflection yoke 21 or other conventional electron beam deflection means is provided for positioning electron beam 16 with respect to face plate 13.

Figure 3:
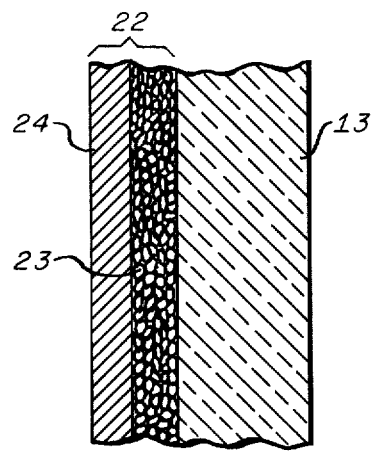
FIG. 3 is a magnified cross section view of the screen elements of FIG. 2.

The novel luminescent screen of the present invention is supported on the face plate 13 so that the deflected electron beam 16 may excite the phosphor particles of screen 22 to luminescence. FIG. 3 illustrates in greater detail the luminescent screen 22 which is composed in part of a layer 23 of cathodo-luminescent penetration phosphor particles. The layer 23 is characterized by including many phosphor particles and is substantially free of voids. The preferred penetration phosphor particles being very small, layer 23 is relatively thin. A light-reflecting metal layer 24 is supported upon phosphor layer 23. It is thin and is composed of a metal such as aluminum, so that it may be readily penetrated by the electrons of beam 16. The display tube 10 may be provided with a mesh grid 29 disposed transversely within conical section 14. Where mesh grid 29 is used, it is connected electrically to the conductive coating 19 so that the display tube may operate according to conventional post-acceleration principles. A separate lead-in conductor as represented at 30 may be supplied for providing a suitable electrical potential to metal layer 24, such as post-acceleration potential. Mesh grid 29 may be eliminated entirely.

Figure 1:
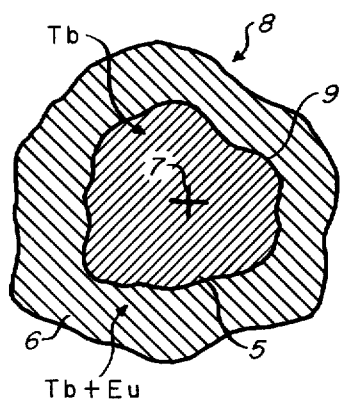
FIG. 1 is a cross section view of a representative phosphor particle according to the invention.

Operation of the invention may be described with reference to FIGS. 1, 2, and 3. Low velocity and hence, low energy, electrons of beam 16, present therein when a relatively low voltage is supplied to terminal 20, strike the surface of the phosphor article 8 and transfer energy to the emission centers provided by the Eu and Tb ions located near the surface of particle 8 in region 6 to produce red spectral emission. If the acceleration voltage at terminal 20 is increased to a maximum value, the high energy electrons of beam 16 strike the phosphor particle 8 and penetrate it deeply. Accordingly, the energy of such electrons tends to be transferred to both kinds of activators throughout particle 8. Electrons of energy intermediate the foregoing two extremum values transfer energy substantially to the single type of activator located in the central region 5 which is the substantial portion of the volume of particle 8, where the Tb ions of region 5 tend to emit green light. The degree of generation of red or green light is arbitrarily controlled by the concentrations of activators and, in use, is controlled also by a conventional type of voltage level programmed power supply coupled to terminal 20.

In the operation of the invention, there is an additional important mechanism provided and it causes transfer of energy from the Tb to the Eu ions where both are coactivators in region 6, involving an induced change in the allowed transitions of electrons in the excited state of the atoms. In particular, the manner in which electrons belonging to the excited Tb ions are permitted to release their energy is changed in region 6 so that there no longer results visible green radiation from the Tb ions in region 6. At the same time as such a quenching action is effected, the Eu red emission mechanism is enhanced. In other words, the energy from electron beam 16 which would have been emitted as green light by the Tb ions of region 6 is now in part transferred to enhance the red radiation of the Eu ions and is in part dissipated in non-radiative electronic transitions.

Figure 4A:
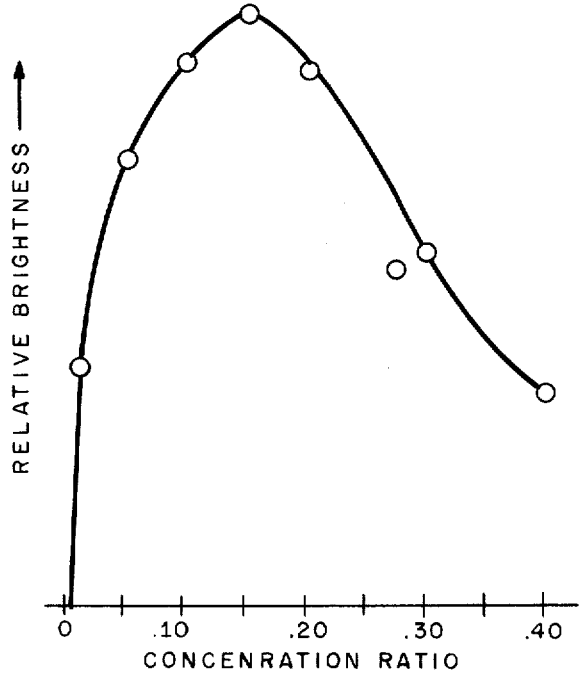
FIGS. 4A and 4B are graphs useful for explaining the typical nature of individual rare earth activators in rare earth hosts.
Figure 4B:
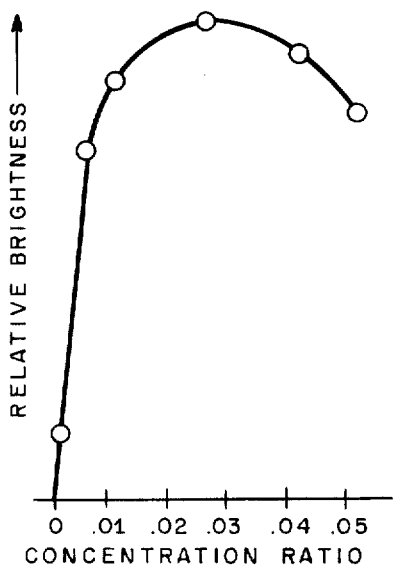

The emission produced by the $La_2O_2S$ phosphor is sensitive to the concentration of its activators. There is a maximum energy conversion efficiency for a particular concentration of activator, efficiency dropping severely for lower and higher concentrations. As the second activator (Eu) of the present invention is added, the additional quenching effect appears, only a small amount of Eu being sufficient to quench Tb green emission. It is experimentally found that the optimum molar Eu ion concentration is about six times as great as the optimum molar Tb concentration. In this patent specification, concentrations are cited in mole ratios of ions. For example, the Eu ion concentration is in terms of $Eu^{+3}$ ions per mole of host. In all cases cited, a mole of host is one mole of $La_2O_2S$. As is shown in FIGS. 4A and 4B and in the typical examples yet to be described, there is a range of values of the activator concentration ratios which proves useful in eliminating green emission from the Tb ions. In FIGS. 4A and 4B there are plotted independent curves of relative brightness on an arbitrary scale as a function of the concentration ratio $x$ (moles activator/moles host) for the activator materials $Eu^{+3}$ and $Tb^{+3}$. It is seen that Tb is much more sensitive to changes in its concentration than is Eu and that the over-all beneficial effect of having Eu ions in the outer section 6 of the $La_2O_2S$ particles is to eliminate green radiation from the Tb ions within region 6. Note the relatively expanded scale of FIG. 4B. The total effect of the energy-transfer mechanism, of the preferred activator concentration ratios, and of the quenching mechanism is to cause region 6 to operate in the same effective manner as the totally different inert barrier layers of the prior penetration phosphor art. In such prior art inert or non-radiating barriers, energy is simply lost as heat and is not usefully or efficiently converted to visible radiation as it is in part in the present invention. Commercial penetration phosphors of the prior art use non-emitting or dead layers as barrier layers on sulfides such as Zn S : Co. In the present invention, the green-emitting rare-earth phosphor emits light at a longer wave length at low electron beam voltages, green emission occuring only at high electron beam voltages.

According to the present invention, the material $La_2O_2S$ : $Tb_2O_2S$ : $Eu_2O_2S$ may be produced by a novel method in which a range of variation in the method steps is possible and in which the concentrations of Tb and Eu ions may be varied over certain ranges with respect to the optimum concentration ratio. In general, the start of the method involves the generation of $La_2O_2S$ : $Tb_2O_2S$ by a commercially known process from an ultra-pure mixture of $La_2O_3$ and Tb $Cl_3$. A suitable typical proportion is approximately 0.025 moles of the Tb ion per mole of $La_2O_2S$. The resultant phosphor $La_2O_2S$ : $Tb_2O_2S$ in powder form is then mixed with an ultra pure powdered Eu compound, tumbled, and fired in an atmosphere including $H_2S$. The part of the resultant powder mixture that is passed by a screen of appropriate mesh is ready for storage or direct use, as will be further described.

While the firing temperature and firing times may be varied, not being very critical, the usual range is from 800° to 1200° Centigrade, with 950°± 50° Centigrade for a 30 minute period being normal. What is required is that diffusion of the Eu ions into the particles of $La_2O_2S$ : $Tb_2O_2S$ be sufficient, so that temperatures lower than 900° Centigrade may successfully be used with correspondingly longer firing times. Successful samples have been made when fired for several hours at temperatures as low as 700° Centigrade. The extent of diffusion may be judged, for example, by examining the spectral behavior of the product under electron bombardment in the usual manner.

The atmosphere under which the $La_2O_2S$ : $Tb_2O_2S$ and Eu compounds is fired is critical. The $La_2O_2S$ is originally formed in an inert atmosphere of Ar containing $H_2S$ and $H_2O$; at elevated temperatures, the $H_2S$ and $H_2O$ present in a closed quartz retort of conventional type are in equilibrium concentration with $SO_2$ and $H_2$ as decomposition products. Thus, the $La_2O_2S$ must, during the Eu diffusion process and afterward as the retort cools, be submerged in a similar $H_2S$, $H_2O$ environment or it will undesirably convert to oxides or oxysulfates. Additionally, the Tb and Eu ions will not be formed at the end of the diffusion program in the form of oxysulfides. In one representative example, a flow of $H_2S$ is bubbled through water at about one bubble per second to carry along $H_2O$ vapor and the combination is mixed with Ar gas. The gaseous mixture of Ar, $H_2S$, and $H_2O$ is then forced through the furnace retort at slightly greater than atmospheric pressure and at a rate of about 50 cc per minute, for example. Representative proportions by volume of the gas are 60 percent Ar, 38 percent $H_2S$, and 2 to 3 percent $H_2O$. Air must be excluded and reagent grade gasses are used.

The chemical compound used as a vehicle for carrying the Eu ions for diffusion into the $La_2O_2S$ : $Tb_2O_2S$ phosphor can be selected from several commercially available chlorides, oxides, or chelates of Eu, including $\beta$-diketones, oxalates, tetramethylheptanedionates, or pentanedionates. The properties of the selected Eu vehicle determine to a degree how effective is the diffusion process and the physical properties of the product phosphor, but the finished product in the outer region 6 is chemically substantially the same $La_2O_2S$ : $Tb_2O_2S$ : $Eu_2O_2S$, the remainder of the vehicle employed having been removed in the firing process. The selected vehicle affects the physical properties of the final penetration phosphor to be generated by using the $La_2O_2S$ : $Tb_2O_2S$ : $Eu_2O_2S$ compounded with other phosphors such as $YVO_4$ : $EuVO_4$, as will be discussed. Several examples of formulae for successfully producing such penetration phosphors may readily be demonstrated.

EXAMPLE (A)

The phosphor $La_2O_2S$ : $Tb_2O_2S$ was obtained in powder form having, for example, 2 parts by weight of $Tb_2O_2S$ for 98 parts by weight of $La_2O_2S$. To 10.0 grams (0.0292 mole) of the $La_2O_2S$ : $Tb_2O_2S$ composition was added 0.1606 grams of Eu $Cl_3$.6 $H_2O$ (0.0004 mole). The mixture was ball mill tumbled in a polyethylene bottle with 2 to 3 ml. of ethanol for about 12 hours. Other inert liquids in which the phosphor material is substantially insoluble, such as water, methanol, diethylether, or acetone may be used. The ethanol or other liquid was then evaporated, leaving a powder mixture that was placed in Pt foil and fired in a retort at 950° Centigrade for 3 hours in a gently flowing atmosphere of Ar containing $H_2S$ and $H_2O$. The furnace was then cooled, the flow of the same atmosphere being continued until the powder was cooled to about 25° Centigrade before the retort was opened.

The resultant white powder was a barrier layer phosphor according to the present invention and was prepared for further use by being sieved through a 400 mesh nylon screen. The average Eu molar concentration ratio with respect to the host produced according to the example is 0.015 mole per mole of $La_2O_2S$ within region 6. The barrier layer phosphor particles 8 were then mixed for example, with $YVO_4 : Eu\ VO_4$, which is a commercially available red-emitting phosphor. The average Eu molar concentration ratio with respect to the host $YVO_4$ was 15 mole percent, though it is found by experiment that this ratio may be varied by ± 5 percent. The novel barrier layer phosphor was mixed with the red-emitting phosphor in substantially a 2.3 to 1 ratio; for example, 209 mg. of the barrier layer phosphor was added to 91 mg. of the red-emitting phosphor to produce 300 mg. of the desired penetration phosphor. Other red-emitting phosphors may be substituted for $YVO_4 : Eu\ VO_4$, such as $Y_2O_3 : Eu_2O_3$ or $Y_2O_2S : Eu_2O_2S$.

EXAMPLE (B)

To 5 grams (0.0146 mole) of $La_2O_2S : Tb_2O_2S$ of composition generally similar to that of example (A) were added 0.0803 grams (0.0002 mole) of Eu $Cl_3.6H_2O$ in a polyethylene bottle with 2 to 3 ml. of ethanol. The mixture was ball mill tumbled for 12 to 24 hours and dried. The powder mixture had an Eu molar concentration ratio of 0.015 and was fired at 980° Centigrade in platinum foil for 1.5 hours, again in an Ar atmosphere with $H_2S$ and $H_2O$ present, and was then cooled to room temperature under the same atmosphere. The resulting barrier layer phosphor was sieved through a 400 mesh nylon screen. The resultant 215 mg. of powder was mixed with 85 mg. of $YVO_4 : Eu\ VO_4$ of composition substantially similar to that of example (A) to produce 300 mg. of useful penetration phosphor.

EXAMPLE (C)

In this example, 10.0 grams (2.92 × $10^{-2}$ mole) of $La_2O_2S : Tb_2O_2S$ as in the foregoing examples were added to 1.6 grams (2.28 × $10^{-3}$ mole) of europium 2, 2, 6, 6 - tetramethyl -3, 5 heptanedionate, which is a typical europium chelate. The mixture was ball milled in 3 ml. of ethanol for several hours and was then dried. The dried powder was fired in platinum foil in a retort at 950° Centigrade for 60 minutes, again under Ar with $H_2S$ and $H_2O$ present. The product was cooled under the same atmosphere and then sieved through a 400 mesh nylon screen to produce 6 grams (a 60 percent yield) of a barrier layer green-emitting phosphor with a Eu molar concentration of 0.08. The barrier layer phosphors of examples B and C may also be used with $YVO_4 : Eu\ VO_4$, a commercially available phosphor of composition $YVO_4$ ( 85 percent) : $Eu\ VO_4$ (15 percent), or other red-emitting phosphors to produce a desired penetration phosphor.

EXAMPLE (D)

In a further example generally similar to example (C), 2.00 grams of $La_2O_2S : Tb_2O_2S$ (5.85 × $10^{-3}$ mole) were added to 290 ml. of a solution of 1 gram of the europium heptanedionate of example (C) in 500 ml. of ethanol. In this case, the $Eu^{+3}$ to host mole ratio is 0.14. The ethanol was evaporated and the resultant powder fired in Pt foil for 5 hours under an atmosphere of Ar with $H_2S$ and $H_2O$. Then, 80 mg. of the resulting barrier phosphor were mixed with 20 mg. of $YVO_4 : Eu\ VO_4$ to yield 100 mg. of the desired penetration phosphor.

EXAMPLE (E)

A further example started with 2.00 grams (5.85 × $10^{-3}$ mole) of $La_2O_2S : Tb_2O_2S$ with 0.0654 grams (1.79 × $10^{-4}$ mole) of Eu $Cl_3.6H_2O$ added to produce a material wherein the Eu ion to $La_2O_2S$ mole concentration ratio was 0.031. The powder mixture was then ultrasonically shaken with 5 to 10 ml. of ethanol. The ethanol was evaporated and the residual powder fired in Pt foil for 100 minutes in the previously described protective atmosphere. After being sieved, the resulting barrier-layer green phosphor was mixed with a red-emitting phosphor such as $YVO_4 : Eu\ VO_4$ to form penetration phosphor samples having respective barrier-layer green phosphor to red phosphor weight ratios of 4 to 1, 3.5 to 1, 3 to 1, 2.5 to 1, and 2 to 1. Samples produced experimentally according to these ratios, though having differently voltage-dependent color characteristics, all serve successfully as penetration phosphors.

EXAMPLE (F)

Figure 5:
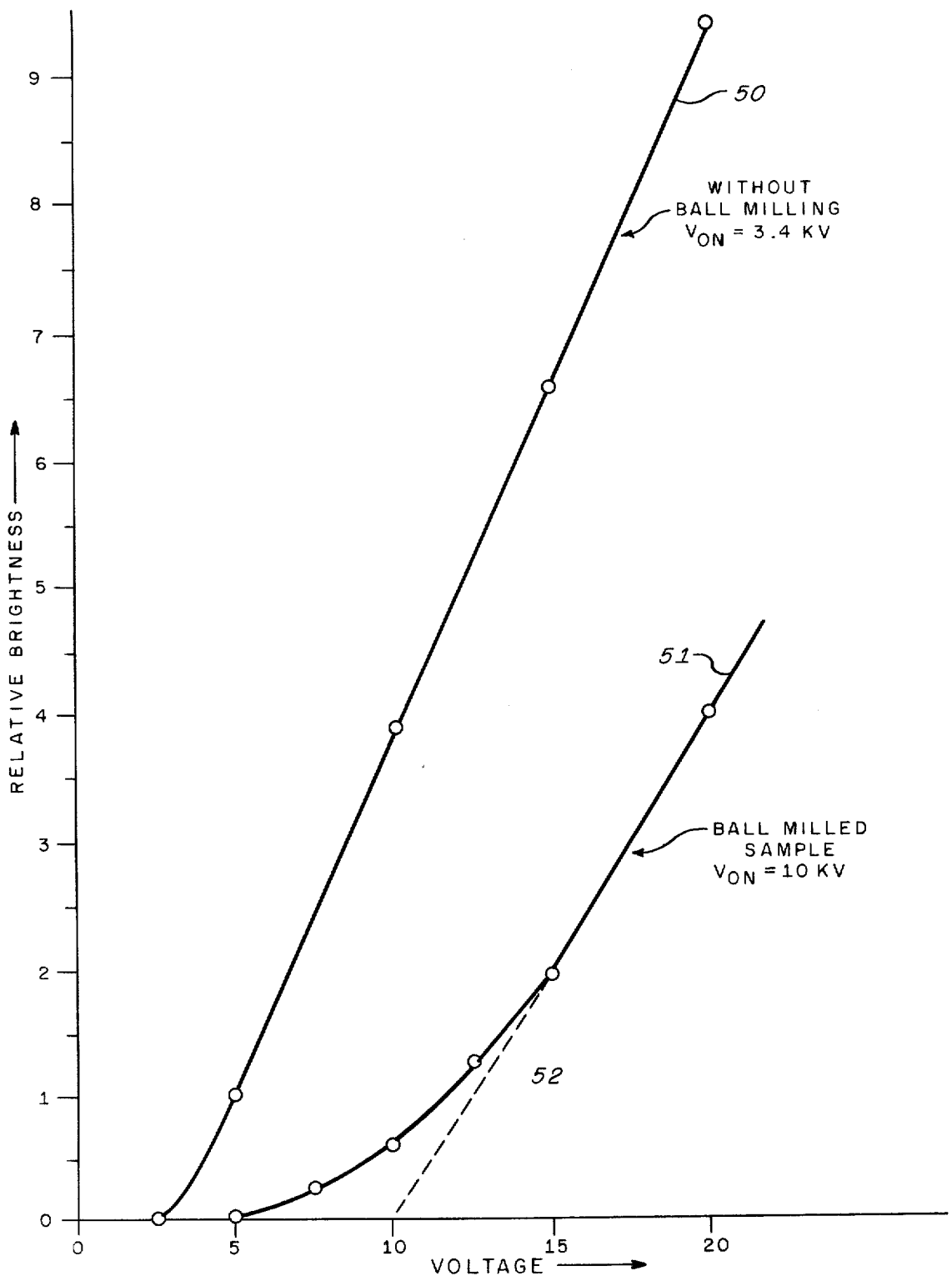
FIGS. 5 through 8 are graphs useful in illustrating the nature of the novel phosphors.

Ball milling of the novel phosphor material during its synthesis is found to improve greatly the uniformity of the distribution of the Eu ions adjacent the surface of the phosphor particles, resulting in a desirably more uniform barrier layer for each phosphor article. This improvement is illustrated in a representative manner in FIG. 5, wherein the curves 50 and 51 illustrate the properties of two material samples prepared in the same manner, only the sample of curve 51 being extensively ball milled. The curves of FIG. 5 show the relative brightness on an arbitrary scale of the electron beam excited phosphor as a function of the electron beam acceleration voltage.

The material used to generate the illustrated experimental data of curve 50 was made by adding 10.00 grams of $La_2O_2S : Tb_2O_2S$ (2.92 × $10^{-2}$ mole) to 1.6 grams of europium 2, 2, 6, 6-tetramethyl -3, 5-heptanedionate (2.28 × $10^{-3}$ mole). The two materials were mixed in a manner generally described in the foregoing in ethanol and were then dried to produce a powder mixture with the ratio of moles of $Eu^{+3}$ ions to moles of the host La material being 0.078. The mixture was then fired in the usual manner. The response of this material supplied in the form of a thin film on a cathode ray screen to electron bombardment is represented by curve 50. A similar phosphor powder using the same $La_2O_2S : Tb_2O_2S$ and heptanedionate components was ball milled for 22 hours with 5mm. diameter glass beads in a polyethylene bottle, was then similarly fired, and was affixed as a thin film to the cathode ray screen. The curve 51 illustrates its properties. With ball milling as in curve 51, brightness is somewhat decreased, but the turn-on voltage $V_{ON}$ is 10 kV., as indicated by the intercept of the dotted line 52 with the zero relative brightness line.

What is generally desired in the product penetration phosphor is a high turn-on voltage $V_{ON}$ and at the same time a high relative brightness. Voltage $V_{ON}$ will increase with increasing Eu concentration, but brightness decreases; the concentration of Eu is therefore chosen so as to strike a reasonable compromise between these two opposing effects. It is seen that the mole ratio (moles of $Eu^{+3}$ per mole of $La_2O_2S$) of 0.01 is highly acceptable, producing a 10kV. turn-on voltage without substantial reduction of emission brightness. Another acceptable Eu ion mole concentration for certain applications is at 0.1, where $V_{ON}$ is high, though there is loss in brightness. It is found that Eu ion mole concentrations below 0.001 generally produce barrier layers of insufficient quality and that concentrations above 0.1 produce dim, inefficient phosphors.

EXAMPLE (G)

In each of the foregoing examples, the desirable characteristics of the novel phosphor may be enhanced by use of the ball milling, the effect of ball milling being to increase the turn-on voltage $V_{ON}$ to an extent that would not normally be expected. It is further found that two or more cycles of doping will similarly be beneficial, a process which will be called serial-doping hereinafter. Serial doping steps are found reliably to provide more uniform exposure of the phosphor particles to the activator material. While the ball milling and serial doping steps are individually advantageous, they may preferably be used in combination for providing desirably high and sharp turn on voltage characteristics. It will be understood that the serial doping process includes at least the following steps:

a. mixing of the constituent phosphor and activator,
b. firing them in $H_2S$, Ar, and $H_2O$ vapor,
c. cooling in the same or an inert atmosphere,
d. adding by mixing the desired activator product of step a and repeating steps b and c, and
e. preparing the film after the step c is taken for its final time.

Step (d) may be repeated several times.

Figure 6:
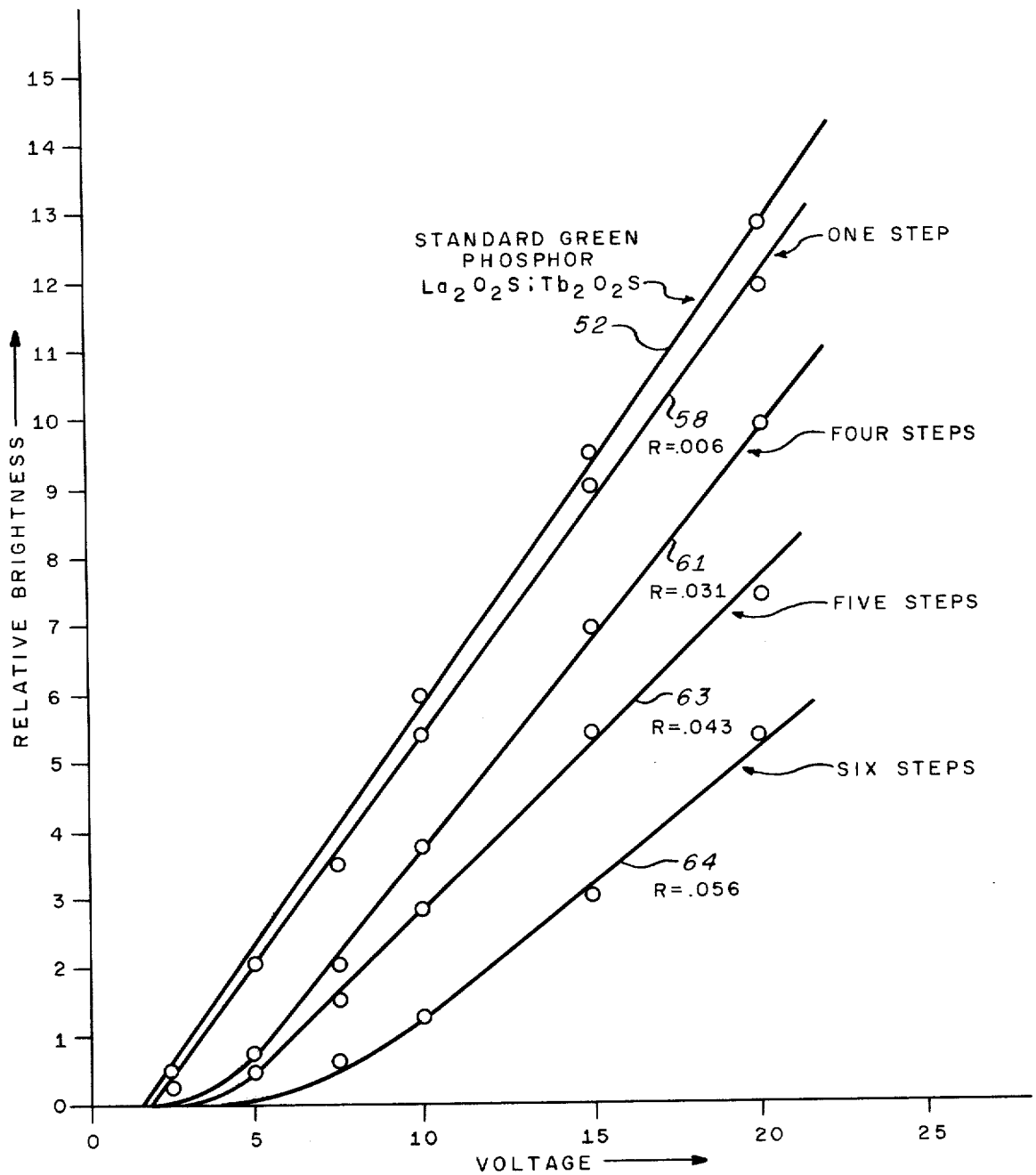

The progressive increase in the value of $V_{ON}$ that is achieved by multiple serial-doping is illustrated in FIG. 6, where the illustrated curves plot electron beam accelaration voltage versus relative brightness for the green phosphor $La_2O_2S$ : Tb as a standard (curve 52) and for a typical phosphor according to the invention. In FIG. 6, the curve 58 represents the properties of the novel phosphor when only one ball milling step is employed; for curve 58, R = 0.006, indicating a low ratio of moles of $Eu^{+3}$ to moles of the host $La_2O_2S$. Progressing through curves 61, 63, and 64 and observing the respective R values of 0.031, 0.043, and 0.056, it is seen that the amount of Eu present increases each time that an extra series doping step is added. In addition, uniformity of the distribution of Eu at the particle surface is achieved, any relatively bare regions at the particle surface after a first doping step being substantially eliminated by a subsequent serial-doping step. The respective four, five, and six step curves 61, 63, and 64 are each seen advantageously to increase $V_{ON}$.

The samples represented by curves 58, 61, 62, 63, and 64 and intermediate samples that may be identified as samples 59 and 60 were all synthesized in a similar manner and the product of each step was the starting material for the immediately following step. In TABLE 1 below, more detailed data is given for each of the samples. In all cases, the phosphor and the activator chelate were mixed without ball milling and were fired and examined in the usual manner.

TABLE 1

| SAMPLE | STEP | PHOS-PHOR (moles) | CHELATE (moles) | R step | R sum |
|---|---|---|---|---|---|
| 58 | 1 | .0234 | $1.42 \times 10^{-4}$ | .0061 | .0061 |
| 59 | 2 | .0199 | $1.50 \times 10^{-4}$ | .0075 | .0136 |
| 60 | 3 | .0176 | $1.43 \times 10^{-4}$ | .0081 | .0217 |
| 61 | 4 | .0155 | $1.43 \times 10^{-4}$ | .0092 | .0309 |
| 63 | 5 | .012 | $1.42 \times 10^{-4}$ | .0119 | .043 |
| 64 | 6 | .011 | $1.42 \times 10^{-4}$ | .0133 | .056 |

EXAMPLE (H)

As observed in the foregoing, cooperative use may advantageously be made of ball milling and serial doping in improving the novel phosphor characteristics. EXAMPLE (H) is representative of phosphors which may be produced in this manner and it will be understood that any of the aforementioned examples may be benefited by the use of ball milling or serial doping or both.

For synthesizing a representative phosphor using both types of improvement steps, 5.000 grams of $La_2O_2S$ : $Tb_2O_2S$ ($1.46 \times 10^{-12}$ mole) was added to 100 mg. of europium 2, 2, 6, 6-tetramethyl-3, 5-heptanedionate ($1.42 \times 10^{-4}$ mole) in a two ounce polyethylene bottle. The two powders were mixed by adding twelve 5 mm. glass beads and ball mill tumbling them for about 5 hours. The powder mixture was then placed in a Pt-lined alumina boat and fired for 1 hour at 920° Centigrade under the usual atmosphere of $H_2S$, Ar, and $H_2O$ vapor. The powder material was then cooled under the same atmosphere. Alternatively, such a material might equally well be cooled under a completely inert gas such as dry Ar, again to prevent formation of the oxysulfate. A sample of this singly-doped material was used for comparison purposes to produce a 6 mg./cm.² film on a cathode ray tube screen and the film proved to have the cathodoluminescent properties presented by curve 71 of FIG. 7 with respect to the reference curve 70 illustrating the voltage versus relative brightness characteristic of the green phosphor $La_2O_2S$ : $Tb_2O_2S$ as a standard. The turn-on voltage $V_{ON}$ for curve 71 is substantially 3 kV.; at 20 kV., the brightness of the novel phosphor of curve 71 is 73.5 percent of that of the standard green phosphor.

A sample of the single-doped end product of the preceeding paragraph was next used for serial-doping purposes. To 3.4596 grams of single-doped material was added 100 mg. of europium 2, 2, 6, 6-tetramethyl-3, 5-heptanedionate ($1.42 \times 10^{-4}$ mole) in a 2 ounce polyethylene bottle with eight 5mm. glass beads. The powders were ball milled for 2 hours and then fired as previously described. After cooling, a 6 mg./cm.² film of the resulting material, when placed on the screen of a cathode ray tube, yielded the characteristics indicated in curve 72 of FIG. 7 when excited by electrons of various energies. Voltage $V_{ON}$, which is about 7.4 kV., is seen to be advantageously increased over $V_{ON}$ for curve 71 (3kV.). Also the relative brightness of the series doped material is as great as 55.5 percent of that of the standard. It was determined that the Eu ion to host mole ratio R for the material of curve 71 is 0.01 and that for the material of curve 72 is 0.024.

A complete penetration phosphor was produced from the series-doped material of curve 72 by mixing 130 mg. of the novel barrier-layer green phosphor with 20 mg. of a commercial red phosphor $YVO_4$ : Eu $VO_4$.

In this mixture, the red phosphor was 13 weight percent of the mixture. A 6 mg./cm.$^2$ layer on a cathode ray tube screen had the following color coordinates at various voltages:

TABLE 2

| kV. | X | Y |
| --- | --- | --- |
| 5 | 0.54 | 0.43 |
| 10 | 0.52 | 0.44 |
| 15 | 0.42 | 0.53 |

A second similar penetration phosphor but having 15.3 weight percent of red phosphor had the following color coordinates:

TABLE 3

| kV. | X | Y |
| --- | --- | --- |
| 5 | 0.61 | 0.38 |
| 10 | 0.53 | 0.44 |
| 15 | 0.48 | 0.49 |
| 18 | 0.47 | 0.50 |

These are standard coordinate values conventionally used for the numerical description of colors as in Kelly charts or the C.I.E. chromaticity diagrams (refer to Color Science by Wyszecki and Stiles, John Wiley, 1967).

It may be noted that the different vehicle compounds used in the diffusion of the Eu ions into the phosphor particles produce useful though somewhat different results. The preferred vehicle is Eu 2, 2, 6, 6-tetramethyl-3, 5-heptanedionate as judged by the brightness of the final penetration phosphor and by its favorable turn-on voltage, which voltage is defined, for present purposes, as the intercept of the extension of the linear part of the brightness versus voltage curve (FIG. 5) with the horizontal axis. While the aforementioned chlorides, oxides, chelates, et cetera, of Eu are found to produce useful results, other compounds in which the ion Eu$^{+3}$ appears to produce unacceptable or only marginal results.

In summary, the desirable range of molar concentrations of Eu ions with respect to the host material is experimentally established according to the foregoing as lying between 0.001 and 0.1 moles per mole of the host $La_2O_2S$. Successful barrier phosphors are readily demonstrated within such ranges and are found to produce penetration phosphors of superior nature when mixed with red-emitting phosphors such as $YVO_4$ : Eu $VO_4$. The usual range of weight ratios of the barrier phosphor $La_2O_2S$ : $Tb_2O_2S$ : $Eu_2O_2S$ to the red-emitting phosphor $YVO_4$ : $EuVO_4$ lies substantially between 4 to 1 and 2 to 1. These latter ranges are, of course, very easily determined in an ordinary mechanical fashion simply by mixing reasonably selected proportions of the barrier and red-emitting phosphors until the desired color range under operating voltages is obtained.

Figure 7:
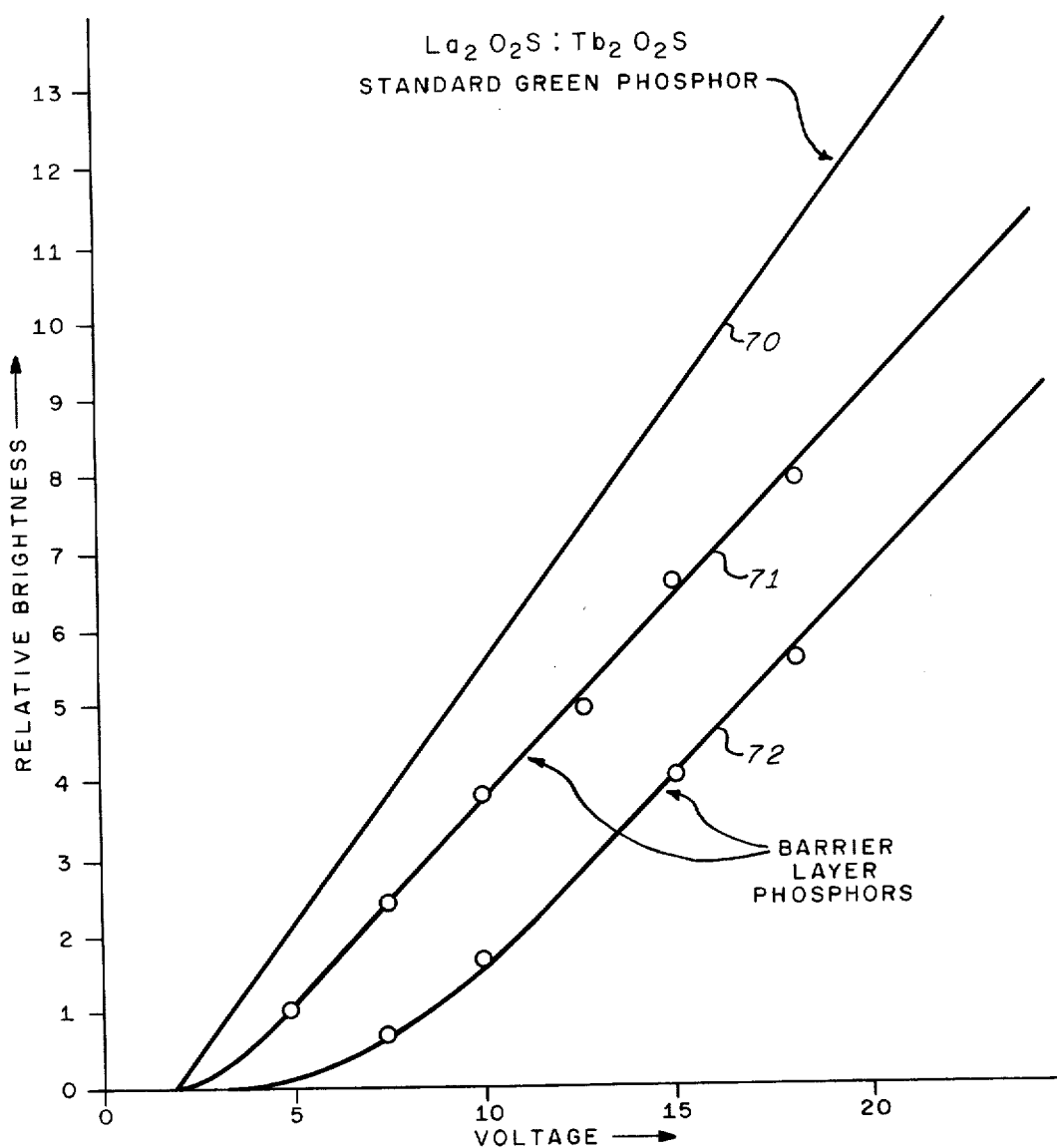
Figure 8:
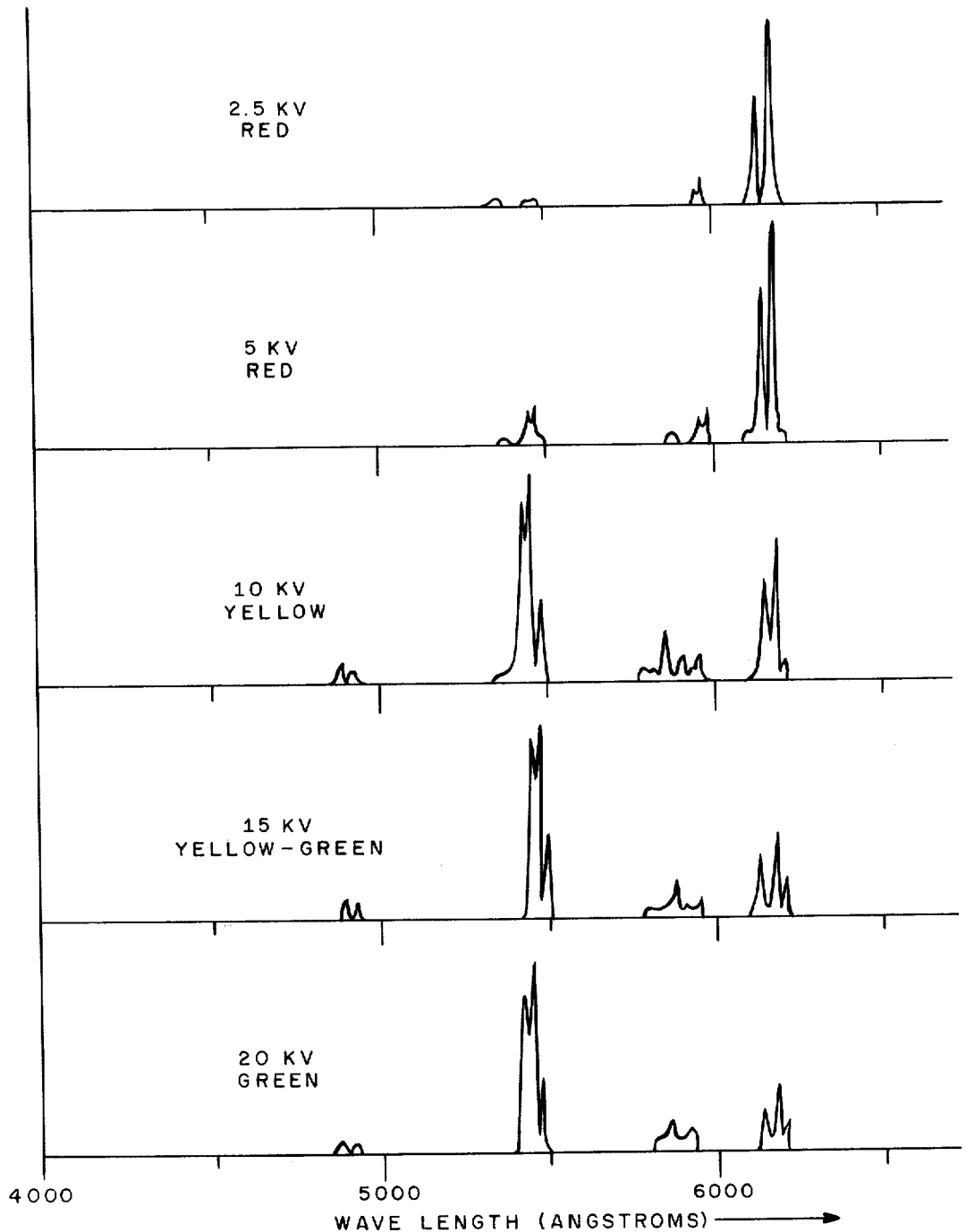

It will be understood that the brightness curves of FIGS. 5, 6, and 7 are relative brightness curves of a composite line spectrum where relative intensities are changing as relative proportions of Eu and the host are altered. Actual spectral energy distributions for a penetration phosphor such as that of Example (H) are illustrated in FIG. 8 for 2.5, 5, 10, 15, and 20 kV. electrons. The emission is narrow line emission under all conditions permitting the use of conventional line filters placed over the cathode ray screen to improve contrast, if desired. The red emission is always present in about the same degree, whereas the green emission varies widely in amplitude. Since the color perceived by the eye is a combination of the red and green components, red is seen at 2.5 and 5 kV., yellow at 10kV., yellow-green at 15kV., and substantially green at 20kV. In fabricating the display tube of FIG. 2, the penetration phosphor particles are settled from a liquid dispersion in the conventional manner upon the inner surface of face plate 13 while the axis of the tube 10 is held vertical. The phosphor suspension may be in ethanol with a few drops of collodion or potassium silicate as a binder, following conventional practice. The thin Al film 24 is also applied in the usual manner. In fact, no significant changes need be made in conventional cathode ray tube production methods in order to use the novel penetration phospor.

Accordingly, it is seen that the invention retains the advantages of prior art penetration phosphor display tubes including ease of application of the phosphor to the face plate of the display tube, the apertured masks of prior color display tubes being no longer needed and only a single phosphor layer needs to be supplied to the face plate. Only a single electron gun is required, thus reducing cost and complexity of the display tube and generally improving its utility in adverse environments.

As compared to prior art penetration phosphors, the composition of the present invention yields line spectral emission at all times, additionally permitting the use of filters to enhance contrast. The novel composition is constructed entirely of compatible rare-earth materials, so the physical and chemical properties of components which interact undesirably are readily avoided. Multicolor operation of the novel penetration phosphor beneficially depends upon an active barrier layer as opposed to inert or non-emitting layers. Multicolor operation is achieved in a single composition and the novel barrier material may be used in cooperation with other phosphors.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. An electron tube including an evacuated envelope, a cathodo-luminescent screen therein, and means for exciting said screen within said envelope by electrons, said screen including cathodo-luminescent particles each comprising:

a generally central region, and
   a generally peripheral region surrounding said central region in contiguous relation therewith,
   said particle being composed of a La phosphor material with a substantially uniform distribution of Tb ions, and
   said generally peripheral region having a distribution of Eu ions increasing toward the exterior surface of said particle,
   said La phosphor material being $La_2O_2S$,
   said Tb ions being provided by $Tb_2O_2S$,
   said Eu ions being provided by $Eu_2O_2S$, and the respective concentrations of $Tb_2O_2S$ and $Eu_2O_2S$ each being substantially smaller than the concentration of $La_2O_2S$.

2. An electron tube as described in claim 1 wherein the relative concentrations of said Tb and Eu ions are such that relatively low velocity electrons striking any one of said particles excite Eu and Tb ions in said peripheral region preferentially to produce red line emission, and relatively high velocity electrons striking one of said particles excite said Tb ions in said central region preferentially to produce green line emission.

3. An electron tube as described in claim 1 wherein the concentration ratio of moles of $Eu_2O_2S$ to moles of $La_2O_2S$ lies between 0.001 and 0.1.

4. An electron tube as described in claim 3 wherein the concentration ratio of moles of $Tb_2O_2S$ to moles of $La_2O_2S$ lies between 0.01 and 0.04.

5. An electron tube as described in claim 1 wherein said cathodo-luminescent particles are produced by:
- selection of $La_2O_2S$ particles containing uniformly distributed Tb ions provided by $Tb_2O_2S$,
- mixing said selected $La_2O_2S$ particles with a powdered organic Eu compound to obtain a composite powder,
- ball milling said composite powder in an inert liquid, and
- firing said composite powder and cooling same in an atmosphere containing at least $H_2S$ gas for diffusing said Eu ions into said generally peripheral region where said Eu ions provide quenching of electron induced spectral green radiation,
- said ball milling process substantially increasing the voltage at which perceptible optical emission is instituted by electron bombardment of said particles.

6. An electron tube as described in claim 5 wherein said composite powder is fired at a temperature lying between substantially 800° and 1200° Centigrade.

7. An electron tube as described in claim 5 wherein said composite powder is fired at a temperature lying between substantially 900° and 1000° Centigrade for at least 30 minutes.

8. An electron tube as described in claim 5 wherein said atmosphere comprises a gas mixture of Ar, $H_2S$, and $H_2O$.

9. An electron tube as described in claim 5 wherein said powdered Eu organic compound consists of a pentanedionate of Eu.

10. An electron tube as described in claim 5 wherein said powdered Eu organic compound consists of a chelate of Eu.

11. An electron tube as described in claim 5 wherein said powdered Eu organic compound consists of oxalate of Eu.

12. An electron tube as described in claim 9 wherein after firing said composite powder and cooling same, at least one serial-doping process is interposed comprising:
- adding by mixing a further portion powdered Eu organic compound to said fired and cooled composite powder to form a further powder mixture,
- firing said further powder mixture and cooling same in said atmosphere containing at least $H_2S$ gas, and
- preparing the said film from said fired and cooled further powder mixture,
- said serial-doping process substantially increasing the voltage at which perceptible optical emission is instituted by electron bombardment of said particles.

13. An electron tube as described in claim 1 wherein said screen additionally contains uniformly dispersed particles of a second cathodo-luminescent material having uniformly distributed Eu as activator ions.

14. An electron tube as described in claim 13 wherein said second cathodo-luminescent material is a red emitting phosphor.

15. An electron tube as described in claim 13 wherein said red emitting phosphor is $YVO_4$.

16. An electron tube including an evacuated envelope, a cathodo-luminescent screen therein, and means for exciting said screen within said envelope by electrons, said screen having cathodo-luminescent particles each comprising:
- a generally central region composed of a $La_2O_2S$ : $Tb_2O_2S$ phosphor,
- a generally peripheral region surrounding said central region in contiguous relation therewith composed of $La_2O_2S$ : $Tb_2O_2S$ : $Eu_2O_2S$ phosphor,
- the $La_2O_2S$ and $Tb_2O_2S$ materials being substantially uniformly distributed in said particle and the relative concentrations of said $Tb_2O_2S$ and said $Eu_2O_2S$ being such that relatively low velocity electrons striking any one of said particles excite said phosphor in said peripheral region preferentially to produce red line emission, and relatively high velocity electrons striking one of said particles excite said phosphor in said central region preferentially to produce green line emission.

17. An electron tube as described in claim 16 wherein the concentration ratio of moles of $Eu_2O_2S$ to moles of $La_2O_2S$ lies between 0.001 and 0.1.

18. An electron tube as described in claim 17 wherein the concentration ratio of moles of $Tb_2O_2S$ to moles of $La_2O_2S$ lies between 0.01 and 0.04.

19. An electron tube as described in claim 18 wherein said screen additionally contains uniformly dispersed particles of a second cathodo-luminescent material for producing enhancing line emission falling substantially on one of said red or green line emissions.

20. An electron tube as described in claim 19 wherein said enhancing line emission falls substantially on said red line emission.

* * * * *